United States Patent [19]

Ronning

[11] Patent Number: 4,823,504
[45] Date of Patent: Apr. 25, 1989

[54] TRAPPING APPARATUS

[76] Inventor: Curtis W. Ronning, R.R. #2, Box 216, Bagley, Minn. 56621

[21] Appl. No.: 176,259

[22] Filed: Mar. 31, 1988

[51] Int. Cl.⁴ .......................................... A01M 23/24
[52] U.S. Cl. ......................................................... 43/96
[58] Field of Search ...................................... 43/96, 88

[56] References Cited

U.S. PATENT DOCUMENTS

| 4,107,868 | 8/1978 | Conibear | 43/88 |
| 4,499,685 | 2/1985 | Sibley | 43/96 |
| 4,720,934 | 1/1988 | Gompers | 43/96 |

Primary Examiner—Gene P. Crosby
Attorney, Agent, or Firm—Robert E. Kleve

[57] ABSTRACT

The invention comprises a trapping apparatus having a pair of jaws pivotally connected together at their ends. The apparatus has a strap mounted to the trap and has a magnet mounted to the strap. The magnet magnetically engages a metal culvert intermediate its height of the culvert with the magnet being sufficient to magnetically support the magnet, strap, and trap to the culvert intermediate the height of the culvert. The culvert is of a type installation wherein there is a waterway therethrough with the surface of the water in the culvert just below the magnetically secured location of the trap whereby animals will swim through the waterway in the culvert near the surface of the water therein and are likely to engage and trigger the trap and be trapped by the trap. The magnet is sufficiently weak in its strength so that upon triggering the trap, the weight of the animal in the trap together with the weight of the trap will cause the trap to disengage from the culvert magnetically and the trap and the trapped animal may sink to the bottom of the waterway where there is less likelihood of their detection by poachers and trespassers.

2 Claims, 2 Drawing Sheets

TRAPPING APPARATUS

This invention relates to trapping apparatus.

It is an object of the invention to provide a novel trapping apparatus having a means to magnetically attach the trapping apparatus to metal conduits wherein a waterway or stream of water is passing through the conduit. The trap is magnetically attached to the metal conduit with a magnet strong enough to hold the trap to the conduit while triggering the trap and yet not strong enough to remain magnetically attached to the conduit once triggered and the animal trapped by the trap is thrashing about in the trap trying to escape the trap, so that the trap and trapped animal will, under the weight and movement of the animal, will detach from the culvert or conduit and gravitate to the bottom of the conduit beneath the water so that poachers and the like will not as easily detect the trap and trapped animal.

It is a further object of the invention to provide a novel means of attaching a trap to metal structure adjacent and above an a waterway so that upon the trap being triggered and trapping the animal, the animal movement and or weight of the animal will cause the trap to detach from the metal structure and submerge in the waterway where it is less likely to be seen by poacher and the like.

It is a further object of the invention to provide a novel means of attaching a trap to structure adjacent and above a waterway so that upon the trap trapping the animal, the animal movement in an effort to escape the trap and or the weight of the animal in the trap will cause the trap to detach from the structure and submerge in the waterway where it is less likely to be seen by trespasser and intruder upon the trap.

Further objects and advantages of the invention will become apparent as the description proceeds and when taken in conjunction with the accompanying drawings wherein.

Briefly, stated, the invention comprises a trap having an attaching means mounted permanently to the trap at one end thereof, said attaching means having a strap with one end attached to the trap where the jaws of the trap intersect and are pivtotally mounted, said strap having its other end extending outward and upward in spaced relation to the sides of the jaws with a magnet magnetically secured along the other end of the strap, said magnet having sufficient magnetic strength to secure the trap and the strap to the magnet and be supported by the same and said magnet having sufficient strength to magnetically support the magnet, the strap, and the trap to a metal culvert with the magnet magnetically attached to the metal culvert, yet weak enough to magnetically detach from the culvert or trap once the trap has been triggered and trapped an animal, under the weight of the animal and or movement of the animal.

Figure 1:
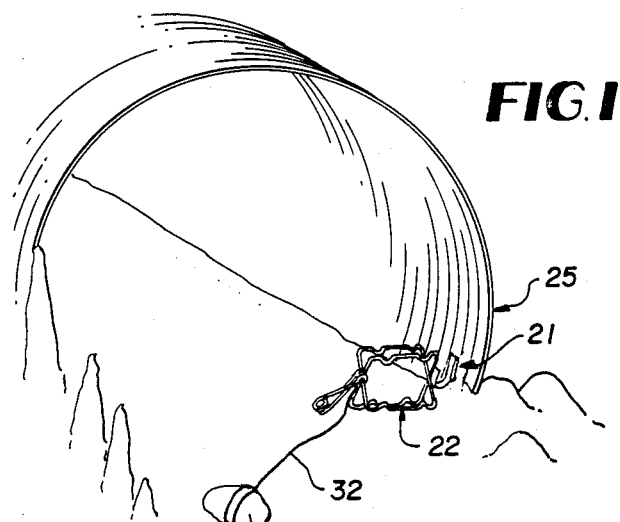
FIG. 1 is a perspective view of the trapping apparatus for trapping mink and other animals and is shown detachable mounted magnetically to a culvert or conduit having a stream of water passing through the culvert or conduit with the trap magnetically attached above the waterway.

Referring more particlarly to the drawings, in FIG. 1, the first form of the invention 20 is illustrated with the magnetic attaching means 21 mount4d to the first form of trap 22. The trap 22 has a strap 23 mounted to the trap at one end 23' and has a magnetic 24 magnetically attached to its other end 23". The magnet 24 in turn is magnetically attached to a culvert 25. The culvert is conventionally made of iron or steel.

In the first form of the invention, the trap 22 is of a conventional construction having a pair of jaws 26 and 27 pivotally mounted together at their lateral ends 26' and 27' and 26" and 27" by bolts 28 and 28'. The bolt 28' also has the strap 23 mounted thereto of the magnetic attaching means. The trap has a conventional spring 29 which is coiled to expand from its position shown in FIGS. 1 and 2 at its ends 29' and 29" and with its ends attached to portions of the two jaws 26 and 27 so that its spring expansive force acts to urge the jaw portions 26' and 27' apart from one another to thereby urge the upper portion 30 of jaw 27 and the lower portion 30" of jaw 26 toward one another and the upper portion 30'" of jaw 26 toward the lower portion of jaw 27 to thereby trap an animal if located therebetween.

The trap 21 is magnetically secured or attached to a culvert so that the trap's upper portion 26' and 27' of the jaws 26 and 27 and the trap's actuating fingers 31' of its conventional triggering mechanism 31 are located just above the level 33 of the water in the culvert, so that an animal, such as a mink or muskrat, in swimming through the conduit on the surface of the water will be in horizontal alignment with the fingers and will likely confront and engage the fingers of the triggerinmg mechanims and upon engagement with the fingers will actuate the triggering mechanims releasing the jaws so that the spring action of the spring 29 will cause the upper and lower portions 26' and 17" of the jaws to move toward one another as well as cause the upper portions 27' and 26" of the jaws to move toward one another to trap an animal therebetween by the jaws engaging the animal from above and below the animal.

Figure 2:
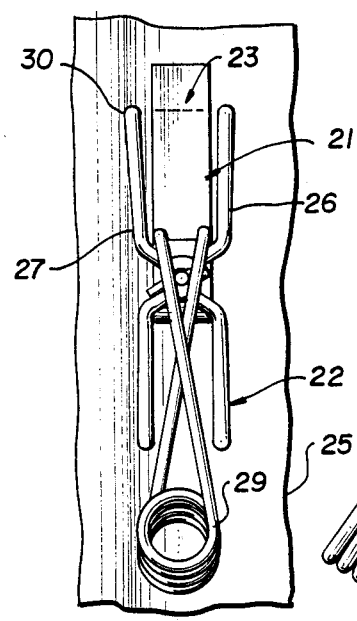
FIG. 2 is an enlarged side elevational view of the magnetic attaching means shown mounted to a trap with the magnetic attaching means shown magnetically attached to the metal side of a culvert.
Figure 3:
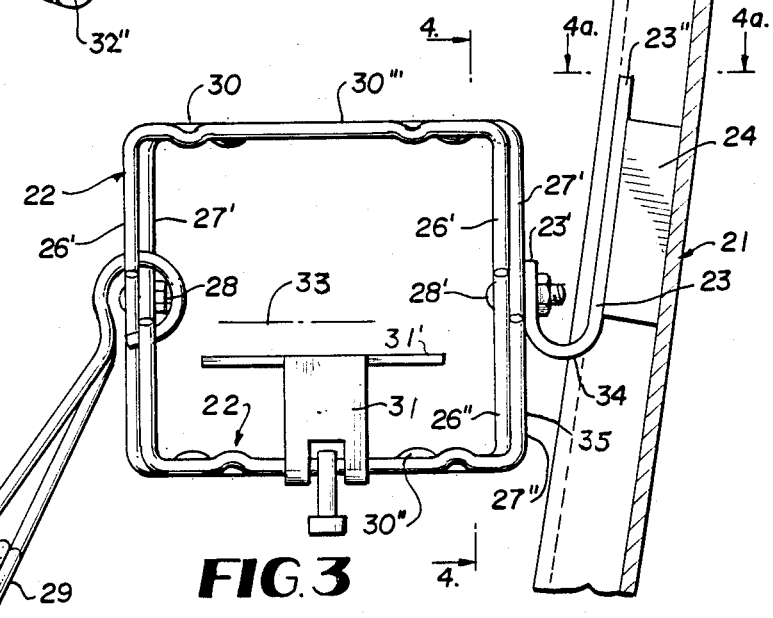
FIG. 3 is an end view of the trap having the magnetic attaching means attached to the trap and the magnetic attaching means magnetically attached to the culvert or conduit.
Figure 4:
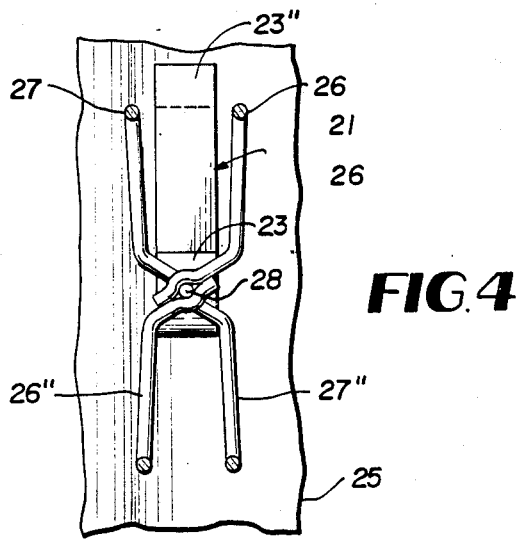
FIG. 4 is a cross-sectional view taken along line 4—4 of FIG. 3.
Figure 4A:
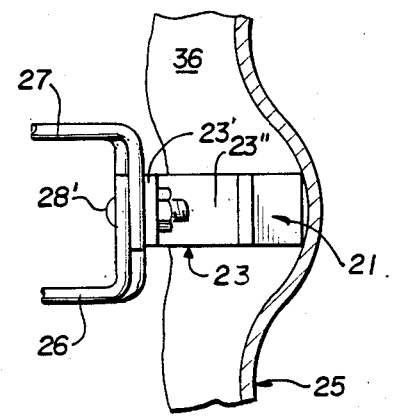
FIG. 4A is a cross sectional view taken along line 4A of FIG. 3.

The triggering mechanism 31 is of a conventional type that holds the portions 26" and 27" of the jaws 26 and 27 respectively in their position shown in FIGS. 1 and 2. Upon movement of the fingers 30 by an animal engaging them, this movement will disengage the triggering mechanism of one of the jaws so that the jaw portions 26" and 27' can move toward one another and the jaw portions 26' and 27" can move toward one another as the jaws are released to move with respect to one another.

The trap 22 will also have a wire cable or chain 32 with one end attached to the trap 22 and with its other end secured by a spike or rock 32" or other means to the ground near the trap to secure the trap from moving away by the trashing action or other action of the animal when trapped by the trap.

The magnet will have enough magnetic strength to hold itself to the the strap 23 and will have enough magnetism to also support the trap and the strap above the bottom of the culvert and above the bottom of the waterway in the culvert, supported on the culvert in the position illustrated in FIGS. 1 and 2.

When the trap is sprung by the triggering of the trap and assuming it trapped an animal such as a mink or muskrat, the thrashing or other action by the animal in an effort to escape and or the weight of the animal in the trap will be sufficient to cause the trap to detach from the culvert by the magnet being sufficiently weak under these circumstances to pull away or detach from the culvert. The detachment of the trap and animal from the culvert will cause the trap and animal to sink to the bottom of the waterway so that the water at least partially covers the trap and animal making it more difficult for a poacher or intruder to see the trap and the trapped animal and less likely to notice the trap and trapped animal so as to reduce the liklehood of persons unlawfully stealing the trap and animal.

The staking or securing of the trap by the cable 32 also prevents the animal from somehow swimming away while trapped in the trap.

The portion 34 of the strap 23 may be bent to change the angle of the strap portion 23" of the strap with respect to the strap portion 23' and with respect to the lateral side portions 35 of the jaws of the trap to adjust the trap with respect ot the strap portion 23' and magnet to enable placing the magnet at different angles for placement at different locations upward and downward along the arcuate interior of the culvert, so that the trap remains horizontal as illustrated, while the strap portion 23" and magnet angle may change with respect to portion 23' so that the magnet may still engage the culvert interior at its upper end lower ends at a substantially flush relation as illustrated, although it may be engaging the culvert at different arcuate locations along the culvert with respect to horizontal. The strap portion 23" is spaced sufficiently far enough away from the strap portion 23" and jaws so that the side portions 35 of the jaws 26 and 27 are far enough away from the inner edge 36 of the culvert so that they will clear the inner edge of the culvert when they move upon triggering without contracting the culvert.

Figure 5:
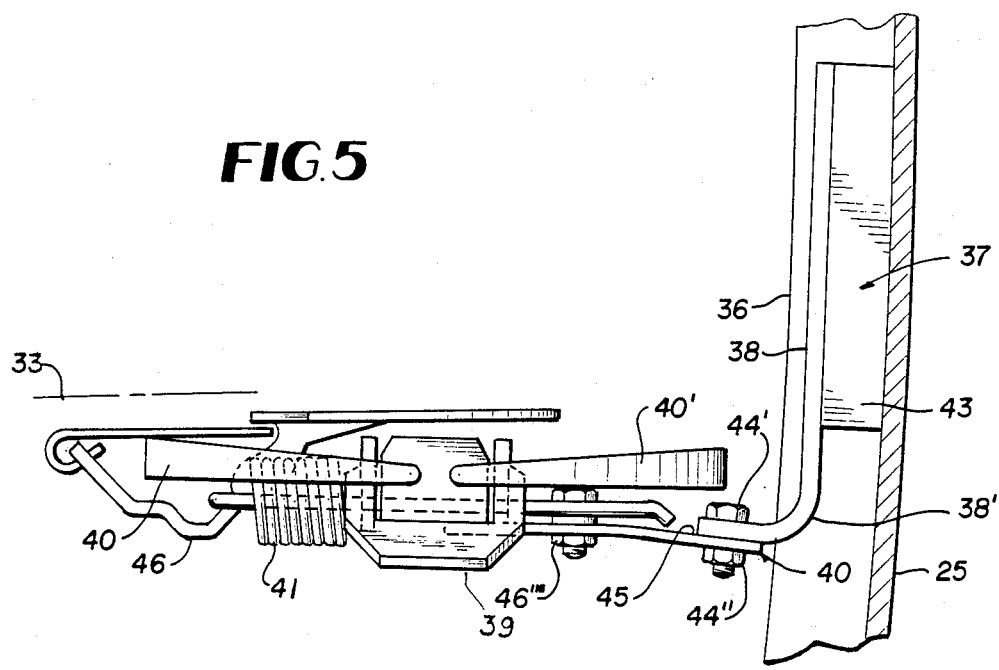
FIG. 5 is a side elevational view of the second form of the invention illustrating a magnetic attaching means attached to the second form of trap, and with the magnetic attaching means extending outward and upward to mount a magnet thereon and with the magnet magnetically mounted to the side of a conduit to in turn support the trap and attaching means to the conduit magnetically.
Figure 6:
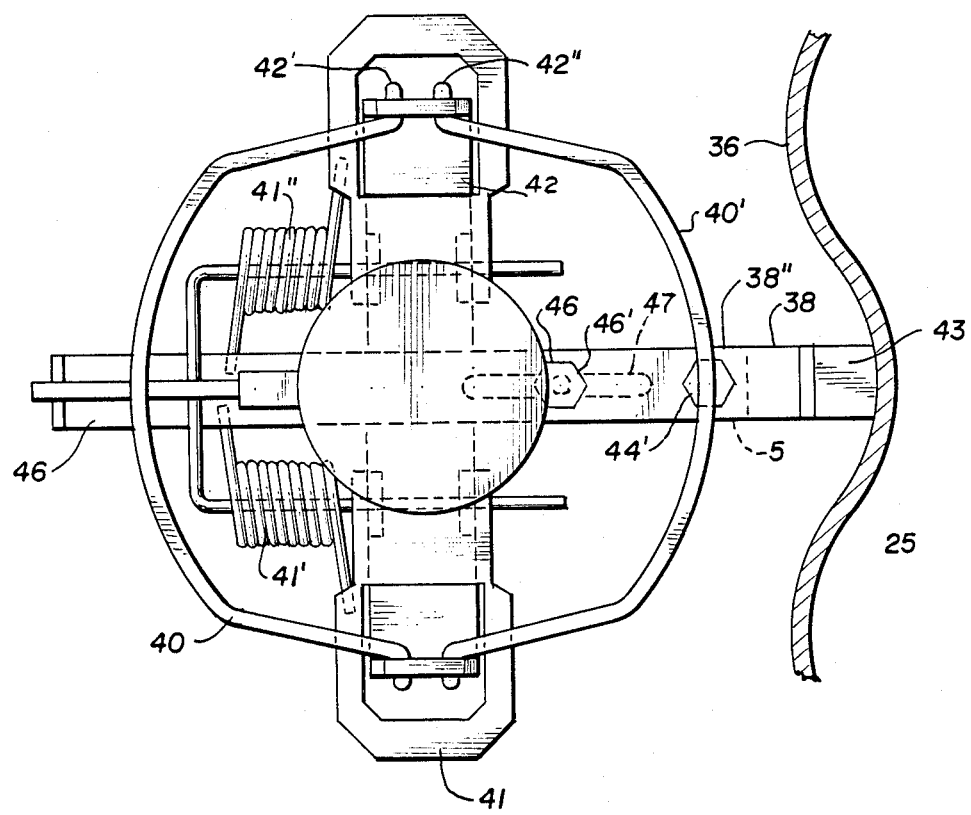
FIG. 6 is a top elevational view of the second form of the invention.

In the second form of the invention illustrated in FIGS. 5 and 6, the magnetic attaching means is similar to the magnetic attaching means 21 of the first form. The magnetic attaching means has a strap 38 having one end attached to a conventional two jaw trap 39 wherein the jaws 40 and 40' are hoizontal when set, as illustrated, and pivot upright about their pivotal mountings 42' and 42" in a strap support 42 when the trap is sprung. A magnet 43 is attached magnetically to the upper end 38" of the strap 38. The lower end 38' of the strap is attached to the trap 39 by being attached to a sliding bracket 45, in a pivotal connection by a bolt 44' and threaded nut 44" holding the straps 38 and 45 together. The straps 46 and 42 are connected together at location 42 is fixed relation by rivets. The bolt 44' holds straps 38 and 45 together in pivotal relation. A bolt 46' passes through a bore 46" in the strap 46 and through a slot 47 in strap 45 with a nut 46" threaded onto the other end of the bolt to lock the straps 45 and 46 together and thereby attach the strap 38 to the trap. The strap 45 can slide in relation to strap 46 of the trap by sliding strap along the bolt in the slot 47 to adjust the distance of the straps 38 and 35 and magnet in the direction of the strap 46.

Plates 41 and 41' pivot the jaws upright by springs 41" when trap is sprung.

The magnet 43 is attached magnetically to the outer end 38" of the strap 38 as in the first form of the invention and the magnet is strong enough to independently support and suspend the strap magnetically on the metal culvert 25 as in the first form, engaging the culvert on its one face and magnetically hold the strap and thereby the trap to its other face; and the magnet, as in the first form of the invention, is weak enough to detach from the culvert once the trap is sprung, detaching customarily under the weight and or movement of the animal in addittion to the weight of the trap. The strap 38 has the same spacing from the trap to allow the jaws to clear the inner face of the culvert when closing, as in the first form of the invention.

The magnet supports the strap and trap in the same manner as in the first form of the invention, along the upward extending portions of the culvert. The strap 38 can be adjusted with respect to the trap bending the strap end 38" with respect to the trap and the other end 38' of the srap, in addition to the slidng adjustment by means of the slot 47 and the pivotal movement by means of the bolt 44'.

Thus it will be seen that a novel trapping apparatus has been provided which secures the trap in a proper location on a culvert for trapping animals such as mink or muskrat in culverts, but which allows the trap to detach from its location on the culvert and further allows the trap and trapped animal to submerge into the water in the culvert once the trap is sprung and the animal is trapped, by the detachment, to prevent or reduce the possibility of detection of the trap by intruders or poachers.

It will be obvious that various changes and departures may be made to the invention without departing from the spirit and scope thereof, and accordingly, it is not intended that the invention be limited to that specifically described in the specification or as illustrated in the drawings but only as set forth in the appended claims wherein:

I claim:

1. A trapping apparatus comprising a trap having a pair of longitudinally extending jaws with lateral end portions pivotally connected together, a mounting strap having one end fixed to the jaws at their pivotal connection, said strap extending outward and upward in a path parallel to the lateral ends of the jaws, a magnet having one surface magnetically securing the strap to the magnet with sufficient magnetic strength to support the strap and the attached trap thereon with another surface having a conformation engagement and the magnetic strength to secure the strap to a metal culvert to support the strap and trap at an intermediate height in the culvert above a waterway in the culvert, with said magnet being weak enough that it will along with the strap and trap detach magnetially and physiclaly from the culvert under the weight or movement noramlly associated with a trapped animal attempting to escape to allow the trap and trapped animal to submerge in the waterway of the culvert to reduced the likelhood of detection of the trap and trapped animal by poachers.

2. A trapping apparatus comprising a trap having a pair of longitudinally extending jaws with lateral portions at the end of the jaws pivotally connected together, a mounting strap mounted at one end to the jaws at their pivotal connection, a magnet mounted to the other end of the strap, a metal culvert of a cylindrical shape and horizontally disposed, said magnet being magneticaly secured to the culvert intermediate its height with sufficient magnetic strength to support and suspend the strap and trap above the bottom of the culvert along the side of the culvert intermediate the height of the culvert, whereby a waterway may pass through the culvert and an animal swiming in the waterway may engage the trap and be trapped by said trap with said magnet being sufficiently weak to detach mangetically from the culvert under the weigth of an animal trapped by the trap so that the trap and trapped animal may submerge in the waterway to less the chance of unwanted detection.

* * * * *